(12) United States Patent
Venkataramani

(10) Patent No.: US 10,318,725 B2
(45) Date of Patent: Jun. 11, 2019

(54) SYSTEMS AND METHODS TO ENABLE AUTOMATIC PASSWORD MANAGEMENT IN A PROXIMITY BASED AUTHENTICATION

(71) Applicant: Symantec Corporation, Mountain View, CA (US)

(72) Inventor: Srinath Venkataramani, Bangalore (IN)

(73) Assignee: Symantec Corporation, Mountain View, CA (US)

( * ) Notice: Subject to any disclaimer, the term of this patent is extended or adjusted under 35 U.S.C. 154(b) by 144 days.

(21) Appl. No.: 15/238,534

(22) Filed: Aug. 16, 2016

(65) Prior Publication Data
US 2018/0004934 A1 Jan. 4, 2018

(30) Foreign Application Priority Data
Jun. 30, 2016 (IN) .............................. 201641022480

(51) Int. Cl.
| | | |
|---|---|---|
| *G06F 21/46* | (2013.01) | |
| *H04L 9/32* | (2006.01) | |
| *G06F 21/32* | (2013.01) | |
| *G06F 21/42* | (2013.01) | |
| *H04L 9/08* | (2006.01) | |

(52) U.S. Cl.
CPC .............. *G06F 21/46* (2013.01); *G06F 21/32* (2013.01); *G06F 21/42* (2013.01); *H04L 9/0891* (2013.01); *H04L 9/3231* (2013.01); *H04L 2209/80* (2013.01)

(58) Field of Classification Search
CPC .......... G06F 21/46; G06F 21/42; G06F 21/32; H04L 9/3226
See application file for complete search history.

(56) References Cited

U.S. PATENT DOCUMENTS

| | | | | |
|---|---|---|---|---|
| 8,495,700 B2* | 7/2013 | Shahbazi | ............... | H04L 63/20 380/247 |
| 8,595,810 B1* | 11/2013 | Ben Ayed | ........... | H04L 63/0815 713/168 |
| 8,683,196 B2* | 3/2014 | Fu | ....................... | H04L 63/0823 705/44 |
| 2010/0154025 A1* | 6/2010 | Esteve Balducci | ..... | H04L 63/20 726/1 |
| 2011/0239267 A1* | 9/2011 | Lyne | ....................... | G06F 21/46 726/1 |
| 2012/0302204 A1* | 11/2012 | Gupta | ................... | H04M 15/44 455/406 |
| 2013/0061307 A1* | 3/2013 | Livne | .................... | H04W 12/06 726/7 |

(Continued)

Primary Examiner — Mohammad A Siddiqi
(74) Attorney, Agent, or Firm — Patterson + Sheridan, LLP

(57) ABSTRACT

The present disclosure relates to changing a password in a proximity-based authentication system. After a successful proximity-based authentication, a password agent may determine that a password does not comply with an administrative password policy. The password agent may then generate a new password that does comply with the administrative password policy and submit a password change request to an administrator of that password policy, without any input by a user at these steps. The user can then request to view the password for input to a service using the same password, and after passing a biometric challenge may view the password.

20 Claims, 9 Drawing Sheets

(56) References Cited

U.S. PATENT DOCUMENTS

| | | | |
|---|---|---|---|
| 2014/0282978 A1* | 9/2014 | Lerner | H04L 63/083 |
| | | | 726/7 |
| 2014/0365782 A1* | 12/2014 | Beatson | G06F 21/32 |
| | | | 713/186 |
| 2015/0172920 A1* | 6/2015 | Ben Ayed | H04W 12/06 |
| | | | 713/172 |
| 2015/0304283 A1* | 10/2015 | Hallett | G06F 21/6254 |
| | | | 726/29 |
| 2015/0326565 A1* | 11/2015 | Kuang | G06F 21/34 |
| | | | 726/4 |
| 2016/0171804 A1* | 6/2016 | Chaar | G07C 9/00071 |
| | | | 340/5.52 |
| 2017/0019396 A1* | 1/2017 | Bettenburg | G06F 17/30879 |

* cited by examiner

SYSTEMS AND METHODS TO ENABLE AUTOMATIC PASSWORD MANAGEMENT IN A PROXIMITY BASED AUTHENTICATION

CROSS-REFERENCE TO RELATED APPLICATIONS

The present application for patent claims priority to Indian Provisional Patent Application No. 201641022480, titled "Automated Propagation of Server Configuration On A Server Cluster," filed on Jun. 30, 2016.

BACKGROUND

Field

Embodiments presented herein provide techniques for authenticating users accessing computing applications. More specifically, techniques are disclosed to enable automatic password management in a proximity based authentication.

Description of the Related Art

Authenticating users via passwords is commonplace. As a result, vigilant entities attempt to enforce password policies that require, for example, passwords to have a minimum length or complexity and to be changed periodically. However, setting requirements for secure passwords often leads to ease of use problems. Users may be unable to remember passwords or have trouble entering long passwords. As a result, long and complex passwords may lead to security risks created by users. For example, users may create a cheat sheet of passwords, re-use a password or a set of passwords across multiple services, or create passwords using a regular pattern.

Proximity based authentication using mobile devices seeks to solve some of the problems of long, complex passwords. This is accomplished by no longer requiring users to remember their passwords or to input their passwords. By instead performing authentication on a mobile device, users can authenticate themselves without having to type a password. However, as proximity based authentication relies on an underlying password to be used to ultimately authenticate the user to the computer, all the behavioral problems relating to long and complex passwords can be present as well. In addition, proximity based authentication introduces new challenges, for example, that users may be more likely to forget their created passwords when they may only enter those passwords infrequently. Further, periodically creating new passwords becomes more of a problem than a solution, as users have to spend time creating new passwords that meet the length and complexity requirements, but that users may only infrequently see or use.

SUMMARY

One embodiment of the invention includes a method for changing passwords. This method may generally include detecting a mobile device in proximity to a computer and authenticating a user associated with the mobile device to the computer using a first password and the mobile device. This method may also include generating a second password for the user in accordance with the password policy and transmitting a request to change the password associated with the user from the first password to the second password.

Another embodiment of the invention includes a computer-readable medium storing instructions which, when executed on one or more processors, performs an operation for changing passwords. This operation may generally include detecting a mobile device in proximity to a computer and authenticating a user associated with the mobile device to the computer using a first password and the mobile device. This operation may further include generating a second password for the user in accordance with the password policy and transmitting a request to change the password associated with the user from the first password to the second password.

Still another embodiment includes a system having a processor and a memory storing instructions which, when executed on the processor, performs an operation for changing passwords. This operation may generally include detecting a mobile device in proximity to a computer and authenticating a user associated with the mobile device to the computer using a first password and the mobile device. This operation may further include generating a second password for the user in accordance with the password policy and transmitting a request to change the password associated with the user from the first password to the second password.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
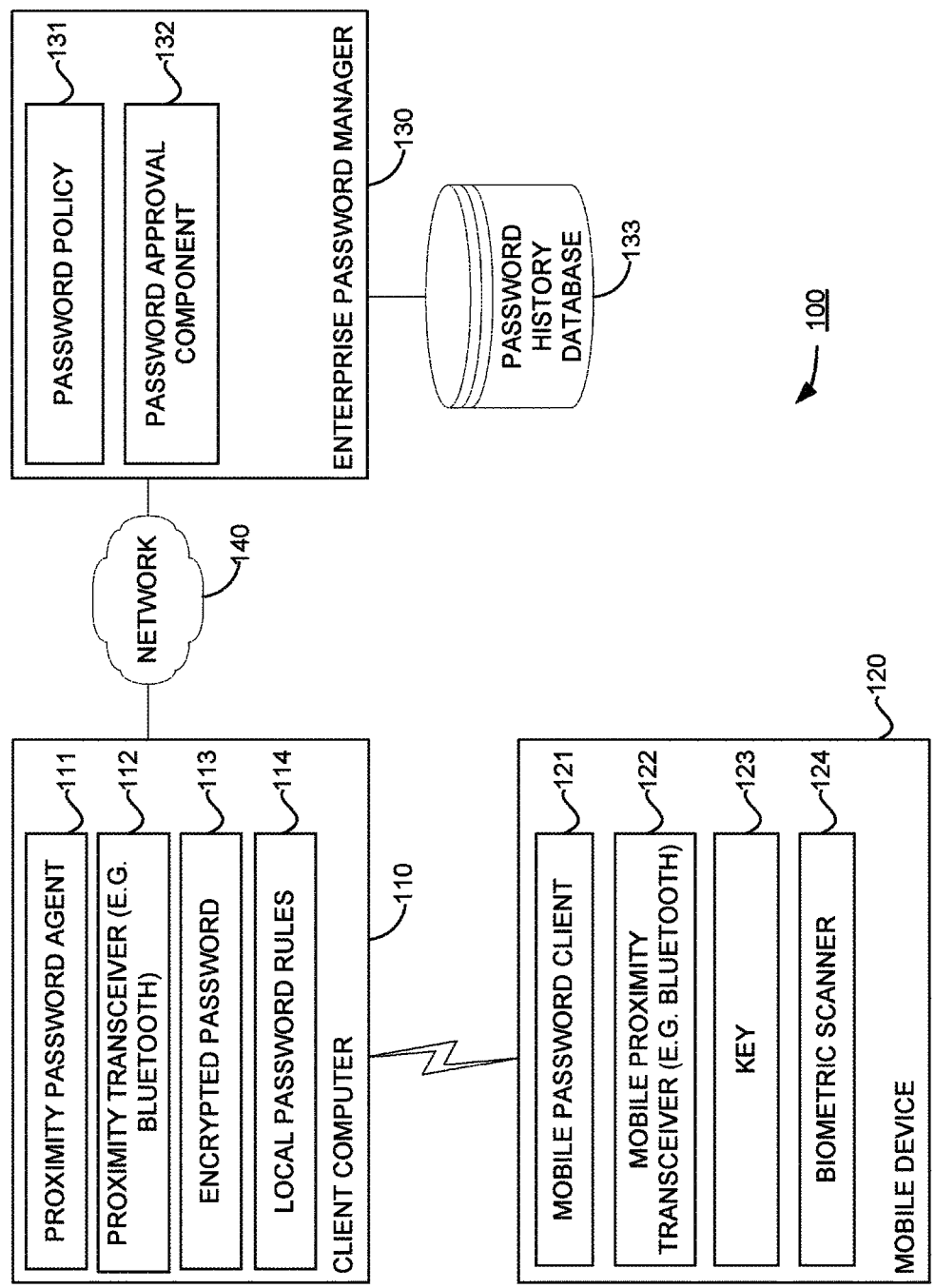
FIG. 1 illustrates an example computing environment, according to one embodiment.

Embodiments presented herein provide techniques for managing passwords in a proximity based authentication process. In particular, embodiments presented herein provide a process for automatically changing passwords before they expire or when the system password policy is updated and a password no longer complies with the updated policy. In one embodiment, a proximity password agent running on a computer authenticates a user to the computer. The user generally has an account or profile on the computer. The authentication relies on a mobile device also associated with the user and a mobile password client (i.e., an "app") running on the mobile device. The proximity password agent stores an encrypted copy of the password used to authenticate the user. The mobile password client stores a key used to decrypt the password. The proximity password agent detects when the mobile device is in proximity to the computer and authenticates the mobile device. Then, the proximity password agent receives the key from the mobile password client running on the mobile device and decrypts the stored password using the received key. Finally, the proximity password agent authenticates the user to an authentication service based on the decrypted password. In one embodiment, the mobile device may authenticate the user with a biometric scan before sending the key to the proximity password agent.

In one embodiment, an enterprise password manager may enforce policy requirements for passwords. For example, the proximity password agent may periodically compare a current password with the policy. If the password does not comply, the proximity password agent changes the password. In one embodiment, the proximity password agent may change the password during the next user authentication exchange. (i.e., when the user authenticates themselves using the proximity based authentication process). If the proximity password agent determines to change the password (e.g., because the current password did not comply with the password policy), the proximity password agent may generate a new password that complies with the policy and submit a password change request to the enterprise password manager, supplying the current and new user passwords. In one embodiment, the proximity password agent may request biometric authentication of the user from the mobile device before changing the password.

In some cases, a user may want to view the password. For example, a user may need to input the password to a service that uses the same password. Because the proximity password agent may change the password stored on the computer based on the policy, the user typically may not know the password. In one embodiment, a user requests to view the encrypted password using the proximity password agent. The proximity password agent may request for a biometric authentication (or other credential challenge) to the mobile device. The mobile device may receive a notification from the proximity password agent requesting biometric authentication, and the notification may occur whether the mobile device is currently running the mobile password client or not. The mobile device authenticates the user using a biometric scanner. If successful, the mobile device sends the key used to decrypt the password to the proximity password agent. The proximity password agent may then decrypt and display the password. In one embodiment, the proximity password agent may, after a certain period of time, remove the password from being visible on the display. In one embodiment, the proximity password agent may store an indicator that the password requires change and subsequently change the password during the next proximity authentication.

As described below, automatically changing user passwords is an effective mechanism to manage passwords in a proximity based authentication scheme. Techniques disclosed herein allow users to authenticate themselves without having to create or remember long and complex passwords, an advantage when password policies require strong passwords or require passwords to be reset often. Further, system administrators may update password policies without worrying that users may have difficulty creating or remembering new passwords to comply with those policies. System administrators may force password updates without disruption, for example in the case of a security breach. In addition, this approach eliminates user behavioral problems associated with passwords, such as reusing a set of passwords for many services, creating passwords according to a pattern, creating cheat sheets of passwords, or any other method resulting in weak passwords.

Note, embodiments of the invention are described below using the commercially available directory service Active Directory (AD), provided by Microsoft Corporation, as an example of an administrative application to manage password policies across an enterprise domain. However, one of skill in the art will recognize that embodiments may be adapted to various applications that manage password policies or otherwise manage computer security on a system-wide basis.

FIG. 1 illustrates an example computing environment 100, according to one embodiment. As shown, the computing environment 100 includes a client computer 110, an enterprise password manager 130, both connected to a network 140 (e.g., the internet). The computing environment also includes a mobile device 120 connected to the client computer via another communication channel (e.g., Bluetooth LE).

As shown, the client computer 110 includes a proximity password agent 111, a proximity transceiver 112, an encrypted password 113 and local password rules 114. In one embodiment, the proximity transceiver 112 detects when the mobile device 120 is in proximity to the client computer 110. Once detected, the proximity transceiver 112 establishes a connection with the mobile proximity transceiver 122. For example, the proximity transceiver 112 and mobile proximity transceiver 122 may communicate using the Bluetooth LE wireless standard. The proximity password agent 111 then communicates with the mobile password client 121 to authenticate the mobile device 120. Following a successful authentication, the mobile password client 121 sends a key 123 to the proximity password agent 111. The proximity password agent 111 decrypts the encrypted password 113 using the key 123, and authenticates the user of the mobile device 120 to the client computer 110 using the decrypted password. In some cases, the mobile password client 121 may perform biometric authentication using biometric scanner 124 to authenticate the user before sending the key 123.

In addition to authenticating users of mobile device 120, the proximity password agent 111 keeps the encrypted password 113 up to date with the password policy 131 available from the enterprise password manager 130. In one embodiment, the proximity password agent 111 periodically checks the enterprise password manager 130 over network 140 for updates to the password policy 131. If the password policy 131 has been updated, the proximity password agent 111 may update the local password rules 114 in accordance with the password policy 131. Further, the proximity password agent may determine if the encrypted password 113 requires change according to password policy 131. First, the proximity password agent 111 checks a password history database 133 to see when the encrypted password 113 was last changed. The proximity password agent 111 then determines the validity period for passwords according to password policy 131. The proximity password agent 111 may determine the password needs to be changed if the encrypted password 113 has come within an administrator specified amount of time before expiry. For example, an administrator may require all passwords to be changed within a month of their expiration dates. After making such a determination, the proximity password agent 111 may store an indicator that the password requires change during the next proximity authentication. In some cases, the proximity password agent 111 may also store an indicator that the password requires change during the next proximity authentication if a given password has been used in proximity authentication a specified number of times. For example, a password may require change, regardless of time left to expiry, if it has been used in an authentication 100 times.

In some cases, the proximity password agent 111 may find a stored indicator that the encrypted password 113 requires change during a proximity authentication. In response, the proximity password agent 111 may generate a new password that satisfies the local copy of the password rules 114. In some cases the proximity password agent 111 may seek an updated version of the password policy 131 available from enterprise password manager 130 before generating the new password. The proximity password agent may then send a request to change the encrypted password 113 to the password approval component 132. This request may include the current encrypted password 113 and the new password. The password approval component 132 verifies that the new password complies with password policy 131. Following successful verification, the password approval component 132 may update the password history database 133 to show encrypted password 113 as having been updated.

In some cases, a user may request to view the encrypted password 113, for example, for input to a service that uses the same password. In such a case, the proximity password agent 111 may receive a request to view the encrypted password. The proximity password agent 111 may request biometric authentication from the mobile password client 121. The mobile password client may perform a biometric scan of the user using biometric scanner 124. Following successful biometric authentication, the mobile password client 121 may send the key 123 to the proximity password agent 111. The proximity password agent 111 may then decrypt the encrypted password 113 using the key 123, and display the password for a specified period of time. Further, the proximity password agent 111 may then store an indicator that the password requires change during next proximity authentication.

Figure 2:
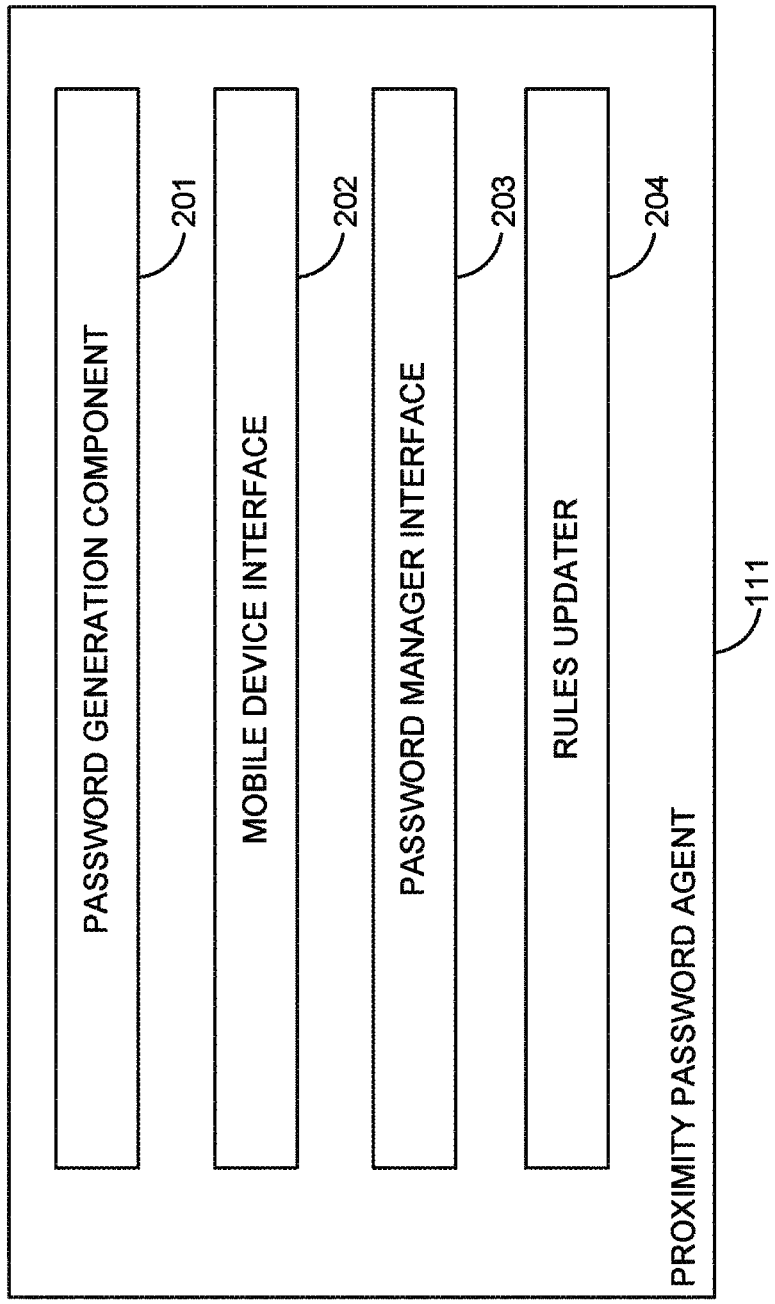
FIG. 2 illustrates components of an example proximity password agent, according to one embodiment.

FIG. 2 illustrates an example of the proximity password agent 111, according to one embodiment. As shown, the proximity password agent 111 includes a password generation component 201, a mobile device interface 202, a password manager interface 203, and a rules updater 204. The password generation component includes one or more software applications used to generate a new password for the user according to local password rules 114. For example, the password generation component may access a pseudo-random data source to generate a new password. Once generated, the password manager interface 203 sends the new password to the enterprise password manager 130 as part of a password change request. The password manager interface 203 also periodically checks the enterprise password manager 130 for updates to the password policy 131. If, during a check, the password manager interface 203 determines that the password policy 131 has been updated, the password rules updater 204 may update the local password rules 114. The password manager interface 203 checks the password history database 133 to see when the encrypted password 113 was last changed. The password manager interface 203 then determines if the encrypted password 113 has come within a certain period of time prior to expiry that password change is now required before expiration occurs. If the password manager interface 203 determines change is required, the proximity password agent 111 may store an indicator that the password requires change during the next proximity authentication.

In one embodiment, the proximity password agent 111 authenticates a user via the mobile device 120. To do so, the mobile device interface 202 communicates with the mobile password client 121 to authenticate the user of the mobile device 120. Once authenticated, the agent receives the key 123 from the mobile password client 121. In turn, the proximity password agent 111 decrypts the encrypted password 113 using the key 123. The mobile device interface 202 also sends requests to mobile password client 121 for biometric authentication in order for proximity password manager 111 to display encrypted password 113. In some cases, the mobile device interface 202 may also request biometric authentication prior to performing a password change.

Figure 3:
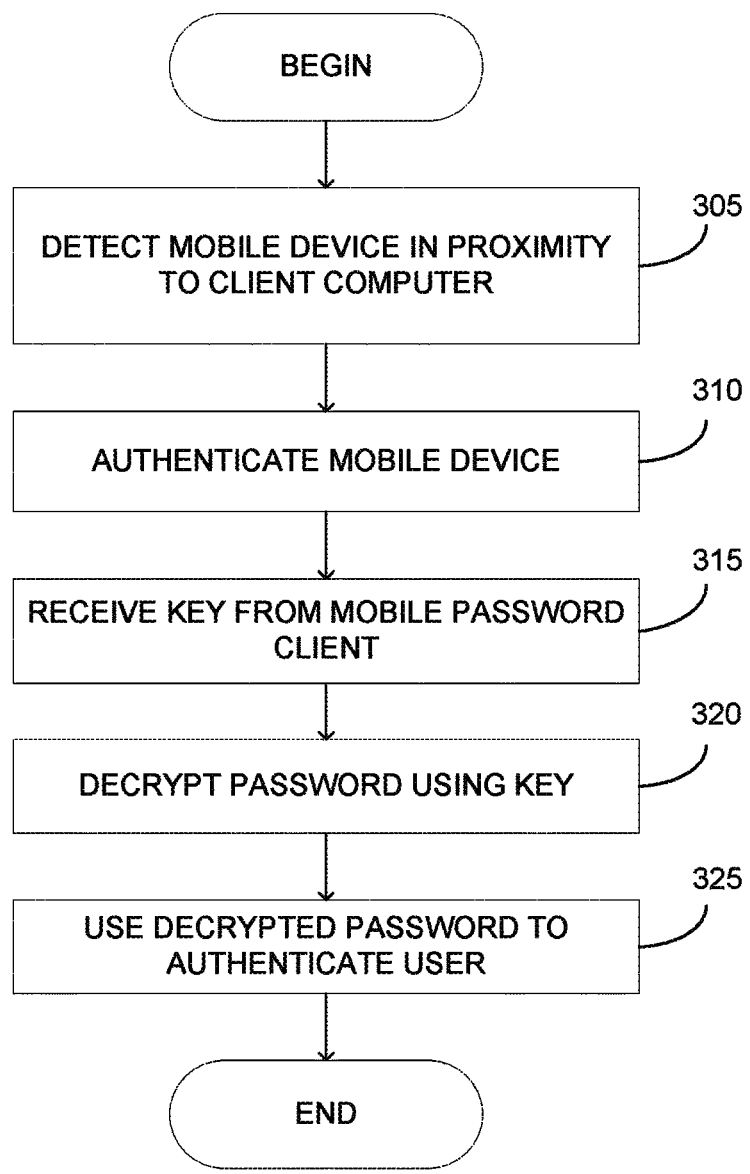
FIG. 3 illustrates a method for a proximity password agent to authenticate a user using a mobile device, according to one embodiment.

FIG. 3 illustrates a method for authenticating a user, according to one embodiment. As shown, the method 300 begins at step 305, where a proximity password agent 111 detects a mobile device 120 in proximity to a client computer 110. For example, the proximity password agent 111 may use a proximity transceiver 112 contained within client computer 110 to detect the nearby presence of a mobile proximity transceiver 122 contained within mobile device 120. Once detected, the proximity password agent 111 communicates with a mobile password client 121.

At step 310, the proximity password agent 111 authenticates the mobile device 120. For example, the proximity password agent 111 may use a public key provided by the mobile password client 121 to confirm that the detected mobile device 120 corresponds to the stored encrypted password 113. For example, this confirmation might include checking the signature of the public key with the signature of another token the proximity password agent 111 knows to be authentic and was received from the mobile device 120. At step 315, the mobile password client 121 sends key 123 to proximity password agent 111. The proximity password agent 111 is unable to use encrypted password 113 without first decrypting the password using the key 123. At step 320, proximity password agent 111 decrypts encrypted password 113 using key 123. At step 325 the proximity password agent 111 uses the decrypted password to authenticate the user to client computer 110. For example, proximity password agent 111 may authenticate the user to an authentication service through an authentication exchange based on the decrypted password, in order to allow the user to access client computer 110.

Figure 4:
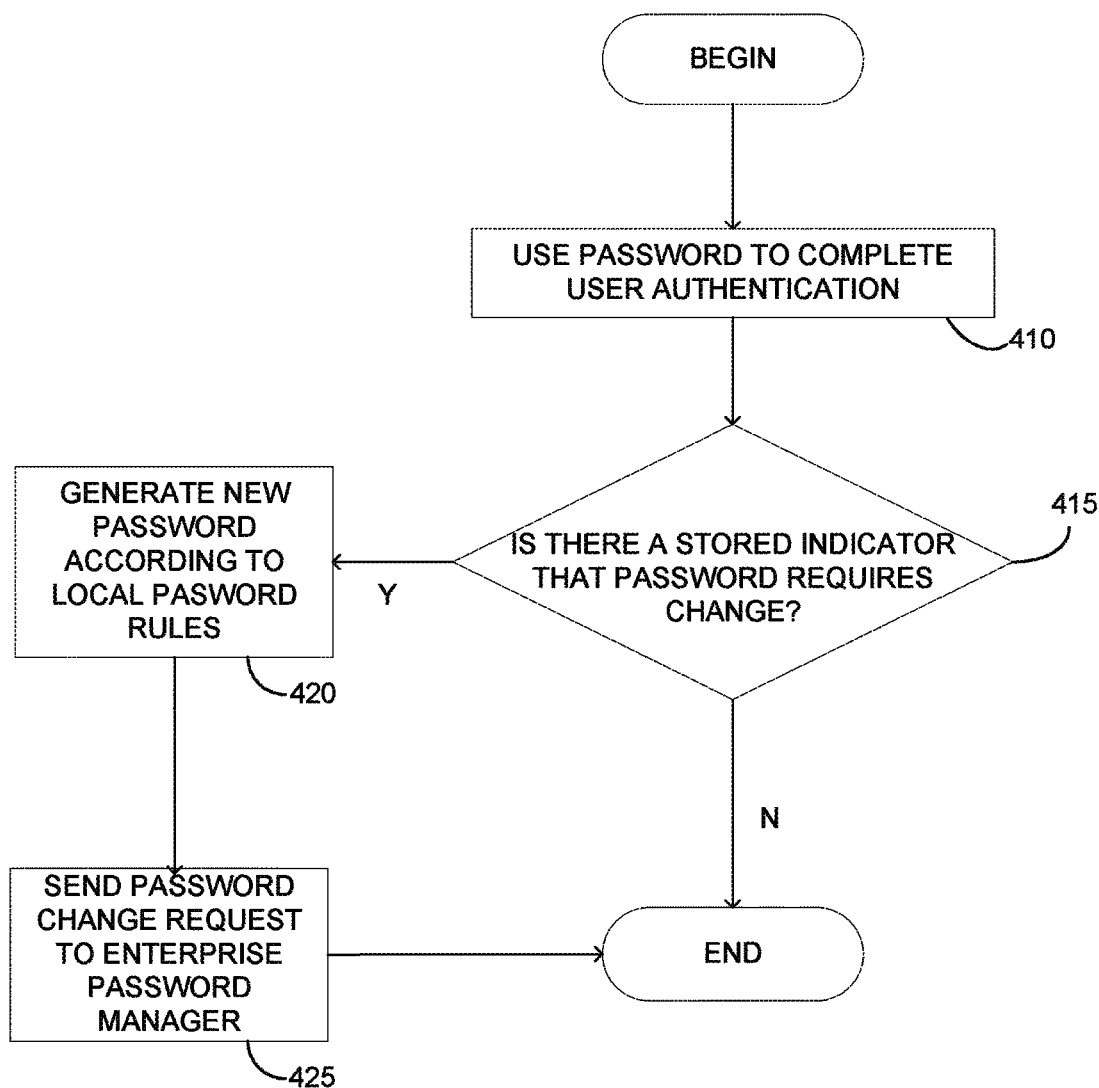
FIG. 4 illustrates a method for a proximity password agent to change a password automatically, according to one embodiment.

FIG. 4 illustrates a method for automatically changing a password, according to one embodiment. As shown the method 400 begins at step 410, where the proximity password agent 111 completes the proximity authentication process. This process generally includes; detecting a mobile device 120 in proximity to client computer 110, receiving key 123 from mobile password client 121 after proximity password agent 111 authenticates mobile password client 121, and decrypting encrypted password 113 using key 123 and authenticating the user to an authentication service based on the decrypted password. At step 415 the proximity password agent 111 checks if there is a stored indicator that the encrypted password 113 requires change. For example, there may be such a stored indicator if the proximity password agent had previously checked the password history database 133 and determined that encrypted password 113 has come within a certain period of time before expiration such that password change was required.

If proximity password agent 111 finds a stored indicator that the password requires change during next proximity authentication, proximity password agent 111 generates a new password at step 420. For example, the password generation component 201 may generate a new password according to local password rules 114. At step 425, the password manager interface 204 sends a password change request to enterprise password manager 130. Such a request may include the new password and current password. In one embodiment, enterprise password manager 130 may verify that the new password complies with password policy 131. Enterprise password manager 130 may use password approval component 132 to verify that the new password complies with password policy 131. Following successful verification, enterprise password manager 130 may update password history database 133 to indicate that the password has been changed. Proximity password agent 111 may thereafter encrypt the new password using key 123, creating a new encrypted password 113, and then discard key 123. If, at step 415, the proximity password agent 111 does not find a stored indicator that the password requires change during next proximity authentication, the method ends.

Figure 5:
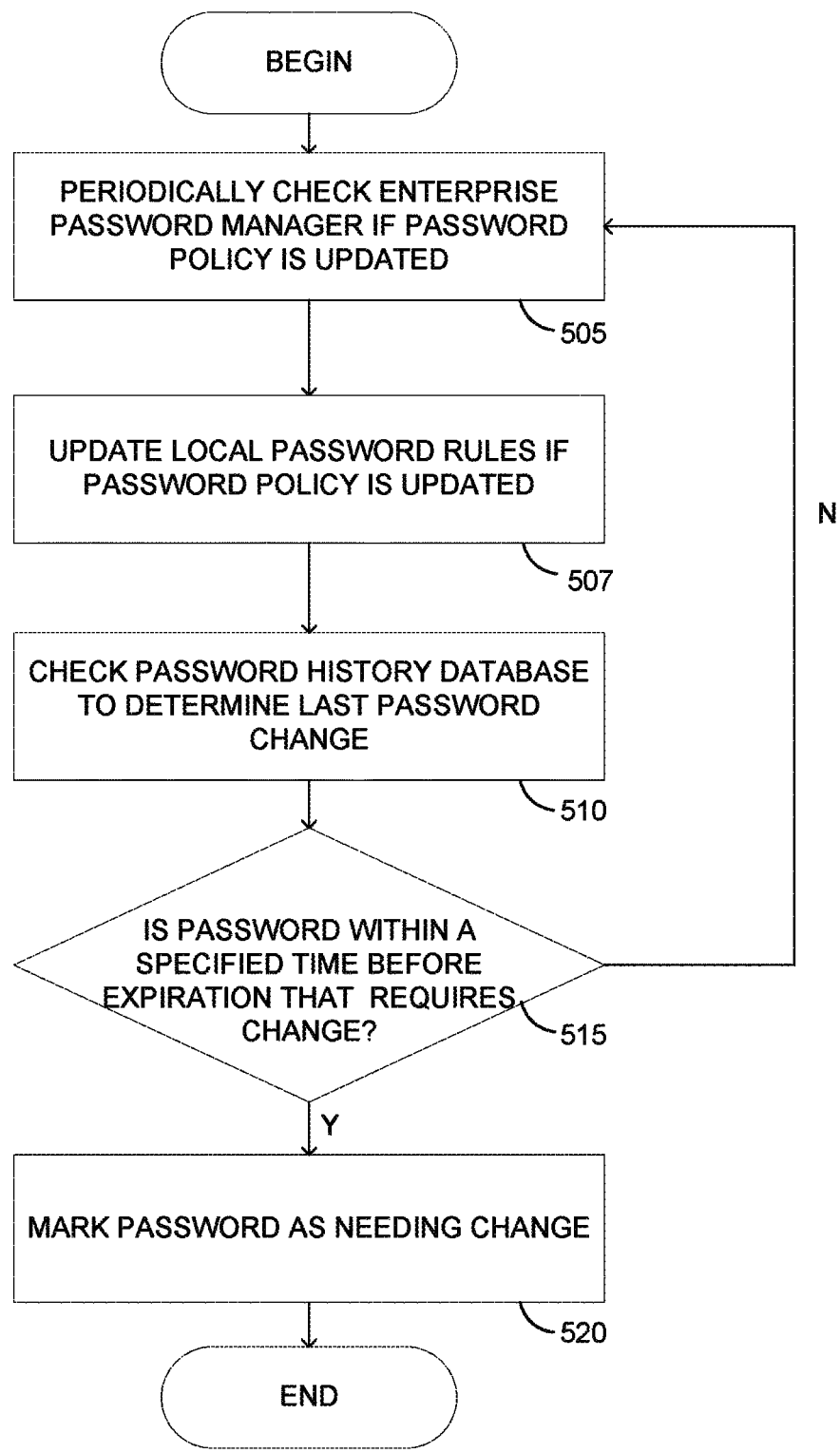
FIG. 5 illustrates a method for a proximity password agent to check an enterprise password manager for an updated password policy and a password change history, according to one embodiment.

FIG. 5 illustrates a method for obtaining an updated password policy and a password change history, according to one embodiment. As shown the method 500 begins at step 505, where the proximity password agent 111 periodically checks the enterprise password manager 130 to see if the password policy 131 has been updated. For example, the proximity password agent 111 may check on a daily basis if Active Directory password settings have changed. Active Directory password settings may determine the password strength rules, like how many characters and what kinds of characters are needed, and password expiration rules, that is, how frequently a password needs to be changed. At step 507, the proximity password agent 111 may update the local password rules 114 if password policy 131 has been updated. For example, the Active Directory settings may have changed the password strength rules to require more characters, or changed the password expiration rules so that all current passwords are within a specified timeframe before expiration such that all require change, as may be desired in case of a security breach. Proximity password agent 111 updates the local password rules 114 so that during password generation it may generate a password that complies with password policy 131.

At step 510, the proximity password agent 111 checks the password history database 133 to determine the last time encrypted password 113 was changed. In one embodiment, enterprise password manager 130 maintains a database of password change times, to determine when a password has entered the specified timeframe before expiration such that the password requires change. At step 515, the proximity password agent 111 determines if encrypted password 113 is within such a timeframe. Proximity password agent 111 makes this determination based on the current password policy 131 specifying how long a password may be used before it becomes expired, and the information in password history database 133 informing when encrypted password 113 was last changed. For example, in the event of a security breach, the Active Directory password settings may have been updated such that all passwords are within a specified timeframe before expiration such that all require change. At step 520, proximity password agent 111 stores an indicator that the encrypted password 113 requires change at the next proximity authentication, if proximity password agent 111 determined in step 515 that encrypted password 113 was within the timeframe prior to expiration such that the password requires change. Proximity password agent 111 may then change encrypted password 113 during the next user authentication. If, at step 515, the proximity password agent 111 determines that encrypted password 113 is not within the timeframe prior to expiration such that the password requires change, proximity password agent 111 may resume periodically checking enterprise password manager 130 for updated to password policy 131.

Figure 6:
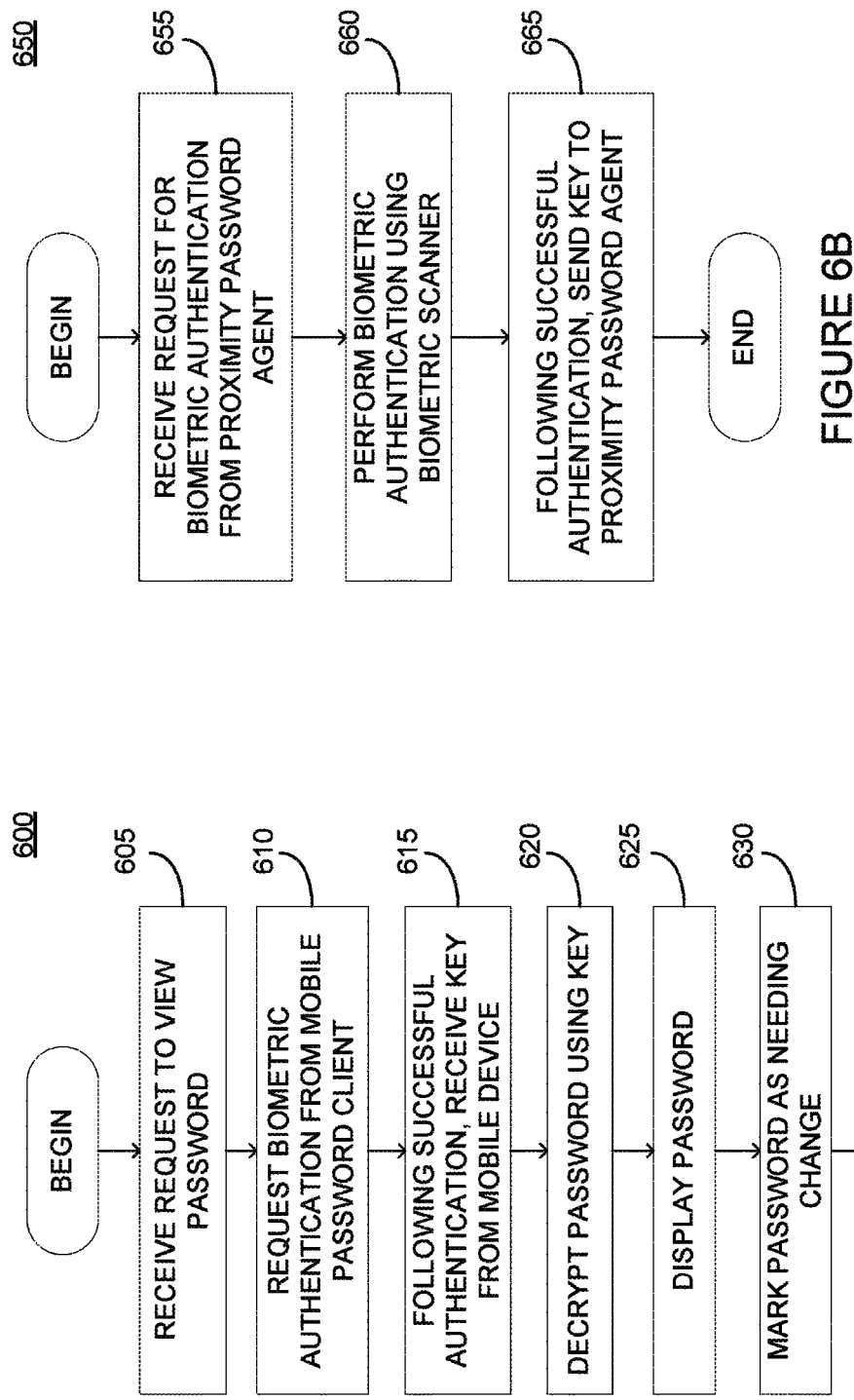
FIG. 6A illustrates a method for a proximity password agent to display a password, according to one embodiment.
FIG. 6B illustrates a method for a mobile device to obtain biometric authentication of a user for use by a proximity password agent, according to one embodiment.

FIG. 6A illustrates a method for decrypting and displaying an encrypted a password using a key recovered from a mobile device, according to one embodiment. As shown, method 600 begins at step 605, where the proximity password agent 111 receives a request to view encrypted password 113. In some cases, the user may require to view the password for input into a service that uses the same password as authentication to the client computer 110. For example, the user may have an email account accessed by the same password. At step 610, the proximity password agent 111 requests biometric authentication from the mobile password client 121. For example, the proximity password agent may try to ensure the person attempting to view the password is in fact the user associated with the mobile device 120 and the client computer 110, and is thus authorized to view the password.

At step 615 the proximity password agent 111 receives key 123 from mobile password client 121, following successful biometric authentication by mobile device 120. In one embodiment, mobile device 120 performs the biometric authentication using biometric scanner 124. At step 620 proximity password agent 111 decrypts encrypted password 113 using key 123. In one embodiment, proximity password agent 111 discards key 123 after decryption. At step 625 the proximity password agent 111 displays the decrypted password on client computer 110. In one embodiment, proximity password agent 111 may display the password for a limited period of time, after which the password disappears. At step 630 the proximity password agent 111 stores an indicator that the password requires change during next proximity authentication. This step ensures that at next user authentication, the proximity password agent 111 can check for such a stored indicator, and change encrypted password 113 if such a stored indicator is found.

FIG. 6B illustrates a method for a mobile device to obtain a biometric authentication for use by a proximity password agent, according to one embodiment. As shown, method 650 begins at step 655, where mobile password client 121 receives a request for biometric authentication form proximity password agent 111. In some cases, the user may request to view the password for input into a service that uses the same password, and proximity password agent 111 may confirm user identity before displaying the password. At step 660, mobile password client 121 performs biometric authentication using biometric scanner 124. For example, biometric authentication may include a fingerprint scan obtained by biometric scanner 224. At step 665, following a successful authentication, mobile password client 121 sends key 123 to proximity password agent 111. This step allows proximity password agent 111 to decrypt encrypted password 113 and display it to the user.

Figure 7:
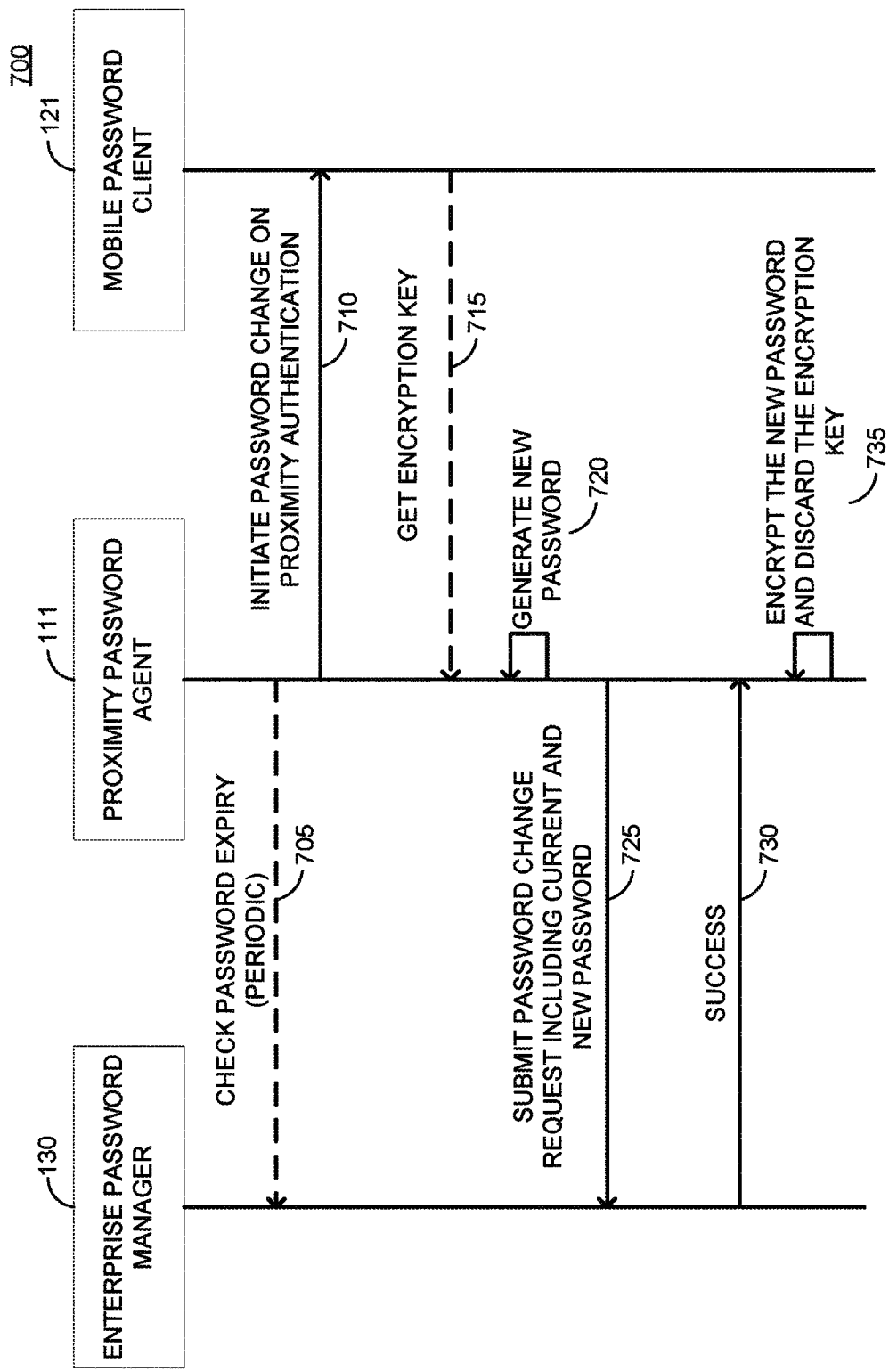
FIG. 7 illustrates a method for a proximity password agent to obtain password expiry information from an enterprise password manager, according to one embodiment.

FIG. 7 illustrates a method for a proximity password agent to obtain password expiry information from an enterprise password manager, so that while authenticating a user, a password can be changed, according to one embodiment. As shown, method 700 begins at step 705, where proximity password agent 111 periodically checks enterprise password manager 130 for expiration of encrypted password 113. Proximity password agent 111 may perform this check to know when encrypted password 113 is within a specified timeframe prior to expiration such that change is required, and thus, needs to be changed at the next user authentication. At step 710, proximity password agent 111 initiates password change on proximity authentication. For example, proximity password agent 111 may have stored an indicator that the password requires change during next proximity authentication following a check of enterprise password manager 130 that showed encrypted password 113 to be within a specified timeframe prior to expiration such that change is required. At step 715 proximity password agent 111 receives key 123 from mobile password client 121. Key 123 is required by proximity password agent 111 to decrypt encrypted password 113.

At step 720, proximity password agent 111 generates a new password to replace encrypted password 113. For example, the password generation component 201 may generate the password according to local password rules 114 and using a pseudo-random data source. At step 725 the proximity password agent 111 submits a password change request, including both the current password and the new password just generated. This step allows the enterprise password manager 130 to confirm that the new password complies with password policy 131. Further, enterprise password manager 130 may update password history database 133 to show that the password was just changed. At step 730 enterprise password manager 130 sends a confirmation of successful change to proximity password agent 111. At step 735 proximity password agent 111 encrypts the new password and discards key 123. Following this step, encrypted password 113 has changed and the new password is now associated with the user.

Figure 8:
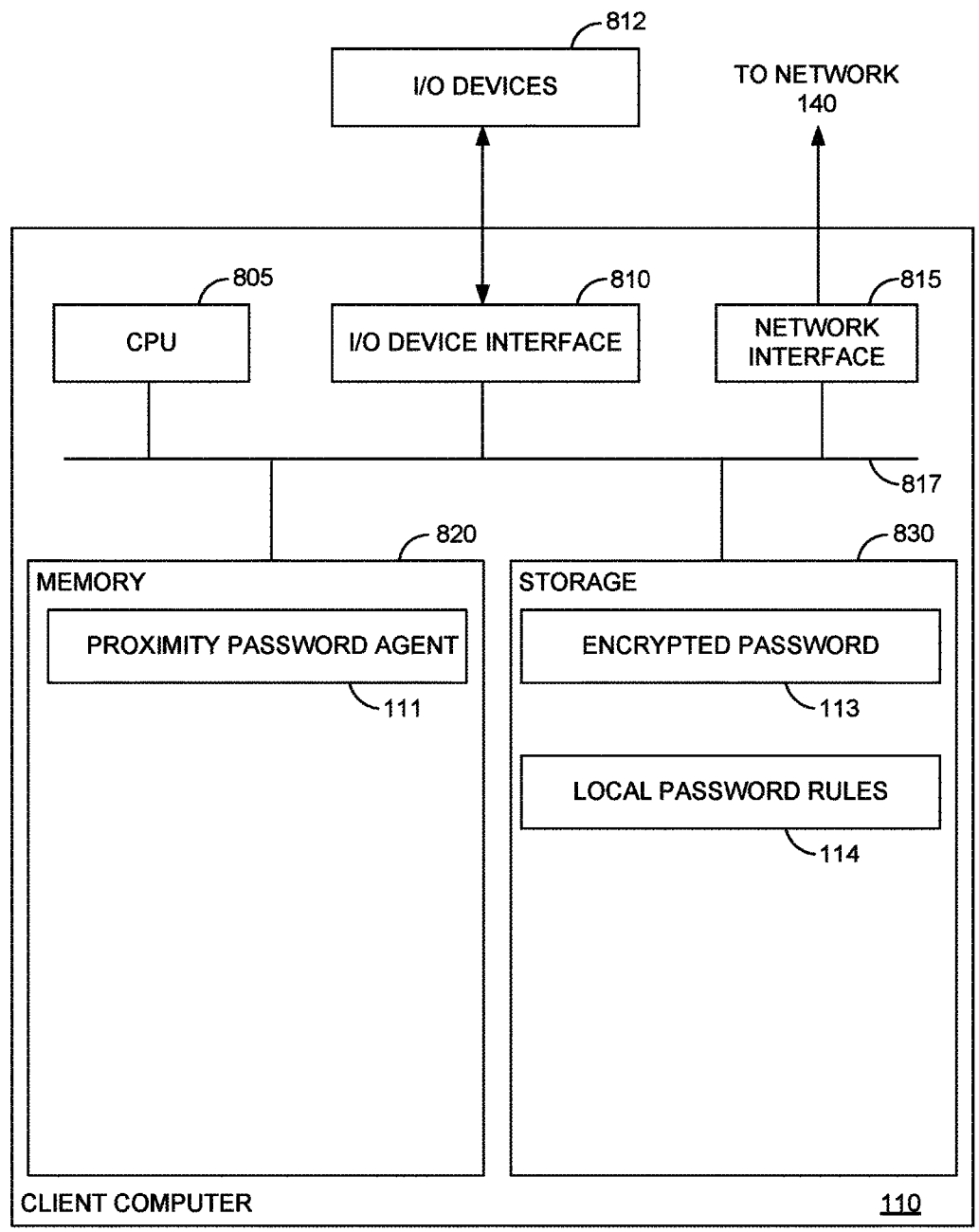
FIG. 8 illustrates an example computing system configured with a proximity password agent used to authenticate users and automatically change passwords according to one embodiment.

FIG. 8 illustrates an example computing system configured with a proximity password agent used to authenticate users and automatically change passwords according to one embodiment. As shown, the computing system 800 includes, without limitation, a central processing unit (CPU) 805, a network interface 815, a memory 820, and storage 830, each connected to a bus 817. The computing system 800 may also include an I/O device interface 810 connecting I/O devices 812 (e.g., keyboard, display and mouse devices) to the computing system 800. Further, in context of this disclosure, the computing elements shown in computing system 600 may correspond to a physical computing system (e.g., a system in a data center) or may be a virtual computing instance executing within a computing cloud.

The CPU 805 retrieves and executes programming instructions stored in the memory 820 as well as stores and retrieves application data residing in the storage 830. The interconnect 817 is used to transmit programming instructions and application data between the CPU 805, I/O devices interface 810, storage 830, network interface 815, and memory 820. Note, CPU 805 is included to be representative of a single CPU, multiple CPUs, a single CPU having multiple processing cores, and the like. And the memory 820 is generally included to be representative of a random access memory. The storage 830 may be a disk drive storage device. Although shown as a single unit, the storage 830 may be a combination of fixed and/or removable storage devices, such as fixed disc drives, removable memory cards, optical storage, network attached storage (NAS), or a storage area-network (SAN).

Illustratively, the memory 820 includes proximity password agent 111 and storage 830 includes the encrypted password 113 and the local password rules 114. The proximity password agent 111 authenticates users and automatically changes the passwords of those users as described above. The proximity password agent 111 uses encrypted password 113 to authenticate users. Proximity password agent 111 does not store the key 123 needed to decrypt encrypted password 113 and needs to receive key 123 from mobile password client 121 to authenticate users. Proximity password agent 111 generates new passwords for users when it needs to using local password rules 114. For example, proximity password agent 111 may change a password when it has previously stored an indicator that the password requires change during next proximity authentication.

Figure 9:
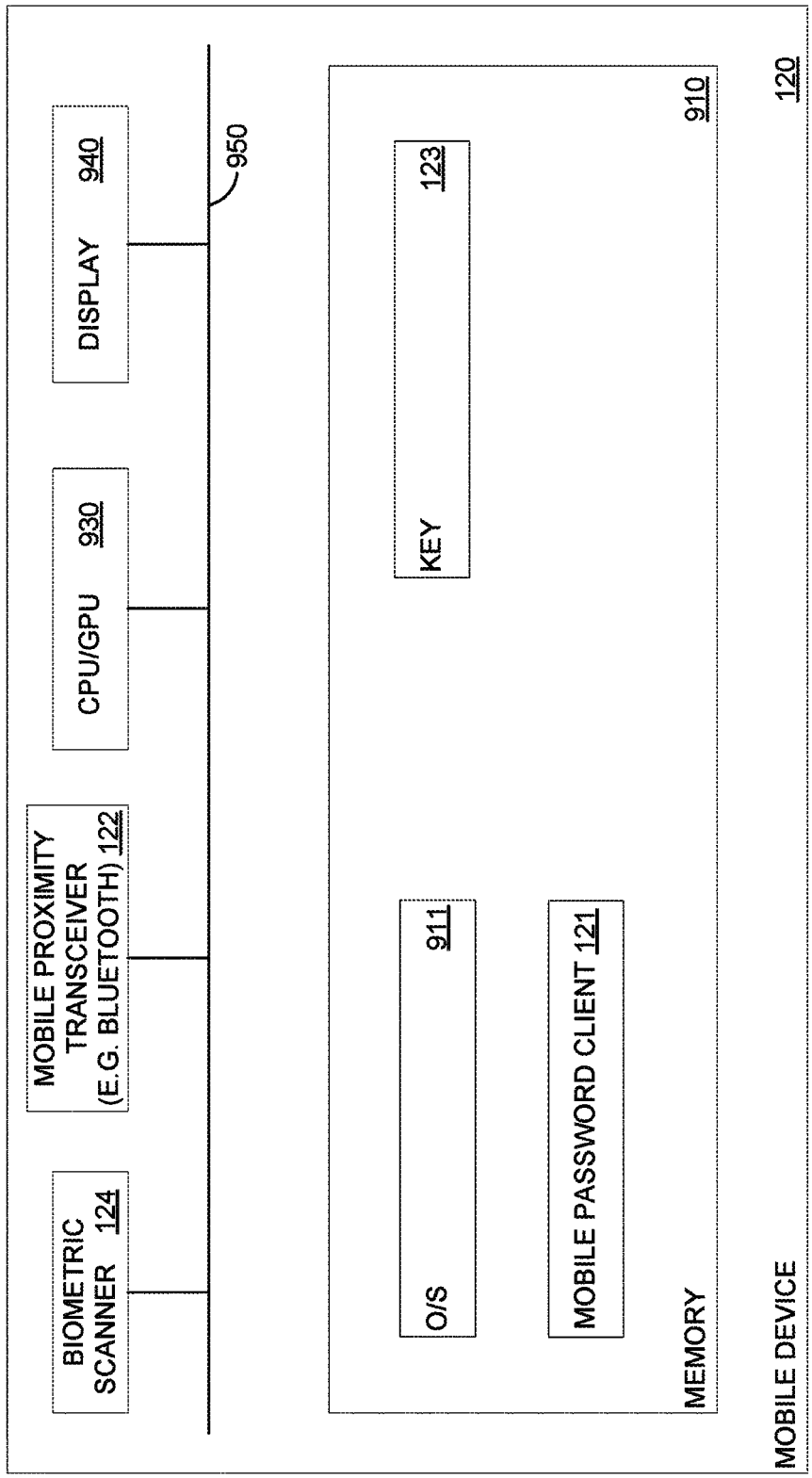
FIG. 9 illustrates an example mobile device used in authenticating a user to a computer, according to one embodiment.

FIG. 9 illustrates an example mobile device used in authenticating a user to a computer, according to one embodiment. In this example, mobile device 120 is used to be representative of a mobile telephone (commonly referred to as a Smartphone) with a touch sensitive display 940 and a biometric scanner 124. Embodiments of the invention may be adapted for use with a variety of computing devices, including PDAs, tablet computers, and other computing devices having a display screen and camera.

As shown, the mobile device 120 includes, without limitation, a central processing unit and graphics processing unit (CPU/GPU) 930, mobile proximity transceiver 122, an interconnect 950, a memory 910 and a storage 930. An actual mobile device will include a variety of additional hardware components.

The CPU/GPU 930 retrieves and executes programming instructions stored in the memory 910. Similarly, the CPU/GPU 930 stores and retrieves application data residing in the memory 910. The interconnect 950 is used to transmit instructions and data between the CPU/GPU, storage 910, mobile proximity transceiver 122, and memory 910. CPU/GPU 930 is included to be representative of a single CPU, multiple CPUs, a single CPU having multiple processing cores, and the like. And the memory 910 is generally included to be representative of memory and storage on a mobile device, e.g., DDR and flash memory spaces.

Illustratively, the memory 910 includes a mobile operating system (O/S) 911, a mobile password client 121 and a key 123. The mobile O/S 911 provides software configured to control the execution of application programs on the mobile device 120. The mobile password client 121 provides a means of communicating with a proximity password agent 111 in order to authenticate a user to a client computer 110. As part of the authentication process mobile password client 121 sends key 123 to proximity password agent 111, where proximity password agent 111 may then use key 123 to decrypt a stored password. In some cases, mobile password client 121 biometrically authenticates users before sending the key 123 to proximity password agent 111. Mobile password client 121 does this via biometric scanner 124.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

What is claimed is:

1. A method for changing passwords by a computer, comprising:
   detecting a mobile device in proximity to the computer, wherein the mobile device and the computer are both associated with a user;
   receiving a decryption key from the mobile device;
   authenticating, by a password agent executing on the computer using the decryption key, the user to the computer based on a first password obtained from the mobile device and the proximity of the mobile device to the computer;
   determining, by the password agent, that the first password does not comply with a password policy;
   generating, by the password agent, a second password in accordance with the password policy;
   while the mobile device is in proximity to the computer, receiving an authorization from the mobile device to change a user password from the first password to the second password; and
   based on the authorization:
      transmitting, from the computer over a network to a password manager, a request to change the user password from the first password to the second password, wherein the request includes the first password and the second password;
      receiving, at the computer from the password manager, a confirmation that the user password has been successfully changed from the first password to the second password; and
      encrypting, by the password agent, the second password for storage on the computer, to enable a subsequent authentication of the user based on proximity of the mobile device to the computer.

2. The method of claim 1, wherein authenticating the user based on the first password and the proximity of the mobile device to the computer comprises:
   decrypting an encrypted version of the first password using the decryption key to generate a decrypted version of the first password; and
   initiating, with an authentication service, an authentication exchange based on the decrypted version of the first password.

3. The method of claim 1, wherein determining that the first password does not comply with the password policy comprises:
   accessing information specifying the last time the first password was changed;
   accessing the password policy to determine a validity period of passwords; and comparing the last time the first password was changed with the validity period of passwords according to the password policy.

4. The method of claim 1, wherein determining that the first password does not comply with the password policy comprises:
   determining how many times the first password has been used to authenticate the user;
   accessing the password policy to determine how many times a compliant password may be used in authentication; and
   comparing how many times the first password has been used to authenticate the user with how many times the compliant password may be used in authentication according to the password policy.

5. The method of claim 1, further comprising:
   prior to authenticating the user, requesting the mobile device to validate an identity of the user with a biometric challenge; and
   receiving a confirmation of completion of the biometric challenge supplied by the mobile device.

6. The method of claim 1, further comprising receiving a request to view the second password.

7. The method of claim 6, further comprising:
   based on the request to view the second password, requesting the mobile device to validate an identity of the user with a biometric challenge;
   receiving a confirmation of completion of the biometric challenge supplied by the mobile device;
   displaying the second password; and
   indicating the second password no longer complies with the password policy.

8. A non-transitory computer-readable medium comprising instructions which, when executed on one or more processors of a computer, perform an operation for changing passwords by the computer, the operation comprising:
   detecting a mobile device in proximity to the computer, wherein the mobile device and the computer are both associated with a user;
   receiving a decryption key from the mobile device;
   authenticating, by a password agent executing on the computer using the decryption key, the user to the computer based on a first password obtained from the mobile device and the proximity of the mobile device to the computer;
   determining, by the password agent, that the first password does not comply with a password policy;
   generating, by the password agent, a second password in accordance with the password policy;
   while the mobile device is in proximity to the computer, receiving an authorization from the mobile device to change a user password from the first password to the second password; and
   based on the authorization:
      transmitting, from the computer over a network to a password manager, a request to change the user password from the first password to the second password, wherein the request includes the first password and the second password;
      receiving, at the computer from the password manager, a confirmation that the user password has been successfully changed from the first password to the second password; and
      encrypting, by the password agent, the second password for storage on the computer, to enable a subsequent authentication of the user based on proximity of the mobile device to the computer.

9. The computer-readable medium of claim 8, wherein authenticating the user based on the first password and the proximity of the mobile device to the computer comprises:
   decrypting an encrypted version of the first password using the decryption key to generate a decrypted version of the first password; and
   initiating, with an authentication service, an authentication exchange based on the decrypted version of the first password.

10. The computer-readable medium of claim 8, wherein determining that the first password does not comply with the password policy comprises:
   accessing information specifying the last time the first password was changed;
   accessing the password policy to determine a validity period of passwords; and
   comparing the last time the first password was changed with the validity period of passwords according to the password policy.

11. The computer-readable medium of claim 8, wherein determining that the first password does not comply with the password policy comprises:
   determining how many times the first password has been used to authenticate the user;
   accessing the password policy to determine how many times a compliant password may be used in authentication; and
   comparing how many times the first password has been used to authenticate the user with how many times the compliant password may be used in authentication according to the password policy.

12. The computer-readable medium of claim 8, wherein the operation further comprises:
   prior to authenticating the user, requesting the mobile device to validate an identity of the user with a biometric challenge; and
   receiving a confirmation of completion of the biometric challenge supplied by the mobile device.

13. The computer-readable medium of claim 8, wherein the operation further comprises receiving a request to view the second password.

14. The computer-readable medium of claim 13, wherein the operation further comprises:
   based on the request to view the second password, requesting the mobile device to validate an identity of the user with a biometric challenge;
   receiving a confirmation of completion of the biometric challenge supplied by the mobile device;
   displaying the second password; and
   indicating the second password no longer complies with the password policy.

15. A computer comprising:
   a processor; and
   a memory having instructions stored thereon which, when executed by the processor, perform an operation for changing passwords by the computer, the operation comprising:
      detecting a mobile device in proximity to the computer, wherein the mobile device and the computer are both associated with a user;
      receiving a decryption key from the mobile device;
      authenticating, by a password agent executing on the computer using the decryption key, the user to the computer based on a first password obtained from the mobile device and the proximity of the mobile device to the computer;

determining, by the password agent, that the first password does not comply with a password policy;

generating, by the password agent, a second password in accordance with the password policy;

while the mobile device is in proximity to the computer, receiving an authorization from the mobile device to change a user password from the first password to the second password; and based on the authorization:

transmitting, from the computer over a network to a password manager, a request to change the user password from the first password to the second password, wherein the request includes the first password and the second password;

receiving, at the computer from the password manager, a confirmation that the user password has been successfully changed from the first password to the second password; and encrypting, by the password agent, the second password for storage on the computer, to enable a subsequent authentication of the user based on proximity of the mobile device to the computer.

16. The computer of claim 15, wherein authenticating the user based on the first password and the proximity of the mobile device to the computer comprises:

decrypting an encrypted version of the first password using the decryption key to generate a decrypted version of the first password; and initiating, with an authentication service, an authentication exchange based on the decrypted version of the first password.

17. The computer of claim 15, wherein determining that the first password does not comply with the password policy comprises:

accessing information specifying the last time the first password was changed;

accessing the password policy to determine a validity period of passwords; and comparing the last time the first password was changed with the validity period of passwords according to the password policy.

18. The computer of claim 15, wherein the operation further comprises:

prior to authenticating the user, requesting the mobile device to validate an identity of the user with a biometric challenge; and receiving a confirmation of completion of the biometric challenge supplied by the mobile device.

19. The computer of claim 15, wherein the operation further comprises receiving a request to view the second password.

20. The computer of claim 19, wherein the operation further comprises:

based on the request to view the second password, requesting the mobile device to validate an identity of the user with a biometric challenge;

receiving a confirmation of completion of the biometric challenge supplied by the mobile device;

displaying the second password; and indicating the second password no longer complies with the password policy.

* * * * *